United States Patent
Kim et al.

(10) Patent No.: US 11,884,105 B2
(45) Date of Patent: Jan. 30, 2024

(54) RUBBER COMPOSITION FOR TIRE TREAD AND MANUFACTURING METHOD THEREOF

(71) Applicant: Korea Kumho Petrochemical Co., Ltd., Seoul (KR)

(72) Inventors: Jae Yun Kim, Daejeon (KR); Yeong Min Jung, Daejeon (KR); Soo Jung Park, Seoul (KR); Eun Kyung Noh, Daejeon (KR); Dong Eun Kang, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 289 days.

(21) Appl. No.: 17/071,674

(22) Filed: Oct. 15, 2020

(65) Prior Publication Data

US 2021/0114411 A1  Apr. 22, 2021

(30) Foreign Application Priority Data

Oct. 16, 2019  (KR) .................. 10-2019-0128463

(51) Int. Cl.
| | | |
|---|---|---|
| *C08F 2/06* | (2006.01) | |
| *B60C 1/00* | (2006.01) | |
| *C08F 8/20* | (2006.01) | |
| *C08F 136/06* | (2006.01) | |
| *C08F 212/08* | (2006.01) | |
| *C08F 236/06* | (2006.01) | |
| *C08K 5/00* | (2006.01) | |
| *C08K 5/01* | (2006.01) | |

(52) U.S. Cl.
CPC .............. *B60C 1/0016* (2013.01); *C08F 2/06* (2013.01); *C08F 8/20* (2013.01); *C08F 136/06* (2013.01); *C08F 212/08* (2013.01); *C08F 236/06* (2013.01); *C08K 5/0016* (2013.01); *C08K 5/01* (2013.01); *C08F 2800/20* (2013.01); *C08F 2810/40* (2013.01)

(58) Field of Classification Search
CPC ........................... B60C 1/0016; C08K 5/0016
See application file for complete search history.

(56) References Cited

U.S. PATENT DOCUMENTS

2014/0155521 A1* 6/2014 Miyazaki ................ C08K 3/06
523/156

FOREIGN PATENT DOCUMENTS

| CN | 101343384 | * | 1/2009 |
|---|---|---|---|
| JP | 2003-253051 A | | 9/2003 |
| JP | 2005-146115 A | | 6/2005 |
| JP | 2015083649 | * | 4/2015 |
| JP | 2015-189873 A | | 11/2015 |
| KR | 10-2003-0045119 A | | 6/2003 |

OTHER PUBLICATIONS

Translation of JP 2015-083649 (Year: 2015).*
Translation of CN101343384 (Year: 2009).*

* cited by examiner

*Primary Examiner* — Robert C Boyle
(74) *Attorney, Agent, or Firm* — NKL Law; Jae Youn Kim

(57) ABSTRACT

Proposed is a rubber composition for a tire tread, which includes: a solution-polymerized elastomer having a conjugated diene-based monomer unit, a solution-polymerized elastomer having an aromatic vinyl monomer unit and a conjugated diene-based monomer unit, or a combination thereof, at 100 parts by weight; and a plasticizer containing an aromatic petroleum resin and an aliphatic olefin polymer, at 10 to 50 parts by weight. Further, a manufacturing method of the rubber composition for a tire tread is proposed.

12 Claims, No Drawings

RUBBER COMPOSITION FOR TIRE TREAD AND MANUFACTURING METHOD THEREOF

CROSS-REFERENCE TO RELATED APPLICATION

This application claims priority to and the benefit of Korean Patent Application No. 2019-0128463, filed on Oct. 16, 2019, the disclosure of which is incorporated herein by reference in its entirety.

BACKGROUND

1. Field of the Invention

The present invention relates to a rubber composition for a tire tread and a manufacturing method thereof, and more particularly, to a rubber composition for a tire tread into which a plasticizer containing an aromatic petroleum resin and an aliphatic olefin polymer is introduced and a manufacturing method thereof.

2. Discussion of Related Art

Braking performance is one of the most important factors in the performance of tires used in vehicles. The braking performance is directly related to safety and, at the same time, has a direct impact on the driving performance of a vehicle. In recent years, as the performance of passenger cars has improved, a consumer's demand for high-performance tires has increased accordingly.

Conventionally, rubber for a tire tread is manufactured by adding a filler to a rubber composition to improve physicochemical properties and essentially contains a process oil as a plasticizer to balance rigidity and improve the processability of a composition. Such a process oil is also called a compounding oil or an extender oil, and as the process oil, mineral oils and especially paraffinic oils, naphthenic oils, aromatic oils, and the like obtained from high-boiling-point oil fractions of petroleum are used. For example, process oils such as residual aromatic extract (RAE) oils, distillate aromatic extract (DAE) oils, treated distillate aromatic extract (TDAE) oils, and mild extracted solvate (MES) oils are used to reduce the viscosity of a rubber composition for a tire tread and improve polymer miscibility in compounding and vulcanization processes.

However, the process oil is a material having a low molecular weight of about 450 g/mol and is a major factor in increasing the generation of volatile organic compounds (VOCs) in tires, which are final products. In addition, the process oil has a problem in that properties thereof easily change under high temperature and aging conditions, causing the performance of a tire to be degraded under harsh conditions such as high speeds.

In order to improve performance degradation caused by the process oil, a method of improving the braking performance of a tire by partially applying petroleum resin when compounding rubber for a tire tread has been proposed, but this method has a problem that fuel efficiency characteristics are degraded. In addition, solid petroleum resin has low dispersibility in rubber, so it is practically difficult to produce a product using more than a certain amount of the solid petroleum resin, and liquid petroleum resin has high viscosity, so there is a problem that user convenience in carrying out rubber compounding is low. Therefore, there is a need for a technique capable of improving braking performance and minimizing the degradation of fuel economy characteristics while improving dispersibility in rubber and user convenience.

SUMMARY OF THE INVENTION

The present invention is directed to providing a rubber composition for a tire tread, which is capable of improving the braking performance of a final product and, at the same time, minimizing the degradation of fuel economy characteristics, and a manufacturing method thereof.

In addition, the present invention is directed to providing a rubber composition for a tire tread, which is capable of improving the dispersibility of each component and improving user convenience in manufacturing a rubber compounding product, and a manufacturing method thereof.

One aspect of the present invention provides a rubber composition for a tire tread, which includes: a solution-polymerized elastomer having a conjugated diene-based monomer unit, a solution-polymerized elastomer having an aromatic vinyl monomer unit and a conjugated diene-based monomer unit, or a combination thereof, at 100 parts by weight; and a plasticizer containing an aromatic petroleum resin and an aliphatic olefin polymer, at 10 to 50 parts by weight.

According to one embodiment, the amount of the aliphatic olefin polymer may be 5 to 60% by weight based on the total weight of the plasticizer.

According to one embodiment, one end or both ends of the aliphatic olefin polymer may be functionalized with a silane-based compound.

According to one embodiment, the aromatic petroleum resin of the plasticizer may be a liquid C9 petroleum resin, and the aliphatic olefin polymer of the plasticizer may be a liquid conjugated diene-based polymer, a liquid saturated hydrocarbon polymer, or a combination thereof.

According to one embodiment, at least some of the double bonds in the liquid conjugated diene-based polymer may be hydrogenated.

According to one embodiment, the liquid C9 petroleum resin may satisfy one or more of conditions (i) to (iii): (i) a glass transition temperature ($T_g$) of −50 to −5° C.; (ii) a viscosity of 500 to 20,000 cP at 60° C.; and (iii) a softening point of 40° C. or less.

According to one embodiment, the liquid conjugated diene-based polymer may satisfy one or more of conditions (i') to (iii'): (i') a glass transition temperature ($T_g$) of −95 to −5° C.; (ii') a molecular weight of 500 to 50,000 g/mol; and (iii') a vinyl content of 0 to 90% by weight.

According to one embodiment, the liquid saturated hydrocarbon polymer may satisfy one or more of conditions (i") and (ii"): (i") a glass transition temperature ($T_g$) of −85 to −65° C.; and (ii") a viscosity of 30 to 3,000 cP at 100° C.

Another aspect of the present invention provides a manufacturing method of a rubber composition for a tire tread, which includes: (a) adding 10 to 50 parts by weight of a plasticizer containing an aromatic petroleum resin and an aliphatic olefin polymer to 100 parts by weight of a solution containing a solution-polymerized elastomer; and (b) removing a solvent contained in a product of the step (a).

According to one embodiment, the amount of the aliphatic olefin polymer may be 5 to 60% by weight based on the total weight of the plasticizer.

According to one embodiment, one end or both ends of the aliphatic olefin polymer may be functionalized with a silane-based compound.

According to one embodiment, the aromatic petroleum resin of the plasticizer may be a liquid C9 petroleum resin, and the aliphatic olefin polymer of the plasticizer may be a liquid conjugated diene-based polymer, a liquid saturated hydrocarbon polymer, or a combination thereof.

According to one embodiment, at least some of the double bonds in the liquid conjugated diene-based polymer may be hydrogenated.

According to one embodiment, the liquid C9 petroleum resin may satisfy one or more of conditions (i) to (iii): (i) a glass transition temperature ($T_g$) of −50 to −5° C.; (ii) a viscosity of 500 to 20,000 cP at 60° C.; and (iii) a softening point of 40° C. or less.

According to one embodiment, the liquid conjugated diene-based polymer may satisfy one or more of conditions (i') to (iii'): (i') a glass transition temperature ($T_g$) of −95 to −5° C.; (ii') a molecular weight of 500 to 50,000 g/mol; and (iii') a vinyl content of 0 to 90% by weight.

According to one embodiment, the liquid saturated hydrocarbon polymer may satisfy one or more of conditions (i") and (ii"): (i") a glass transition temperature ($T_g$) of −85 to −65° C.; and (ii") a viscosity of 30 to 3,000 cP at 100° C.

DETAILED DESCRIPTION OF EXEMPLARY EMBODIMENTS

Hereinafter, the present invention will be described with reference to exemplary embodiments of the present invention. However, the present invention can be implemented in various different forms and thus is not limited to the embodiments described herein.

Throughout the present specification, when it is stated that a part is "connected" with another part, this includes not only cases where the parts are "directly connected" with each other, but also cases where the parts are "indirectly connected" with each other through a member interposed therebetween. In addition, when it is stated that a part "includes," "comprises," or "contains" a component, this means that the part may include, rather than excluding, other additional components, unless stated explicitly to the contrary.

In the present specification, the expression "one selected from the group consisting of A, B, C, and a combination of two or more thereof" is meant to include all of "A," "B," "C," "A and B," "B and C," "A and C," and "A, B, and C."

When a numerical value is presented in the present specification, the value has the precision of a significant figure in accordance with the standard rules of chemistry for significant figures, unless the precision of the value is specifically stated otherwise. For example, a numerical value of 10 includes numbers in the range of 5.0 to 14.9, and a numerical value of 10.0 includes numbers in the range of 9.50 to 10.49.

In the present specification, "elastomer" refers to a polymer that is deformed when an external force is applied but returns to its original shape when the external force is removed, "a polymer having an A monomer unit" and "a polymer having an A monomer unit and a B monomer unit" refer to a polymer formed by polymerizing A monomers and a copolymer formed by polymerizing A monomers and B monomers, respectively, and "solution polymerization" refers to a method of dissolving one or more types of monomers in a specific type of solvent used as a polymerization medium in the presence of a catalyst or an initiator and then polymerizing the monomers. "Petroleum resin" refers to a resin produced using petroleum-derived by-products as raw materials, and "liquid" refers to a material that is present as a liquid phase at room temperature. "Hydrogenation" has the same meaning as the addition of hydrogen and refers to a reaction in which hydrogen is added to unsaturated bonds in a polymer, and "functionalization" refers to a method in which a compound different from monomers forming a polymer is introduced into the middle or end of the polymer chain during or after the polymerization of the polymer so that bonding strength with fillers can be improved or properties of a product can be controlled.

Rubber Composition for Tire Tread

A rubber composition for a tire tread according to one aspect of the present invention may include: a solution-polymerized elastomer having a conjugated diene-based monomer unit, a solution-polymerized elastomer having an aromatic vinyl monomer unit and a conjugated diene-based monomer unit, or a combination thereof, at 100 parts by weight; and a plasticizer containing an aromatic petroleum resin and an aliphatic olefin polymer, at 10 to 50 parts by weight.

The conjugated diene-based monomer may be one selected from the group consisting of 1,3-butadiene, 2,3-dimethyl-1,3-butadiene, piperylene, 3-butyl-1,3-octadiene, isoprene, 2-phenyl-1,3-butadiene, and a combination of two or more thereof, but the present invention is not limited thereto.

The aromatic vinyl monomer may be one selected from the group consisting of styrene, α-methyl styrene, α-ethyl styrene, p-methyl styrene, vinyl toluene, and a combination of two or more thereof, but the present invention is not limited thereto.

The solution polymerization may be carried out using, for example, one selected from the group consisting of an aliphatic hydrocarbon, a cyclic aliphatic hydrocarbon, an aromatic hydrocarbon, and a combination of two or more thereof as a solvent, and the solvent may be, for example, one selected from the group consisting of n-pentane, n-hexane, n-heptane, isooctane, cyclohexane, toluene, benzene, xylene, and a combination of two or more thereof, but the present invention is not limited thereto.

The elastomer may be functionalized with a compound containing at least one of N, S, O, and Si, but the present invention is not limited thereto. When one end or both ends of the non-polar elastomer are functionalized with the above-described compound having polarity, bonding strength with polar fillers such as silica can be improved, and the mechanical properties and fuel efficiency characteristics of a final product can be improved. Since a plasticizer containing an aromatic petroleum resin and an aliphatic olefin polymer is uniformly mixed with an elastomer in the rubber composition for a tire tread according to one embodiment of the present invention, less VOCs are generated as compared to existing rubber for a tire tread using a process oil, and at the same time, properties are easily maintained under harsh conditions.

The aromatic petroleum resin is capable of improving the braking performance of a final product, and the aliphatic olefin polymer is capable of preventing the degradation of the fuel efficiency characteristics of a final product caused by the aromatic petroleum resin. When the aromatic petroleum resin and the aliphatic olefin polymer are used in combination, since the above-described effects complement each other, compared to the case of using the aromatic petroleum resin or the aliphatic olefin polymer alone, a final product having superior properties can be implemented.

The aromatic petroleum resin may refer to a petroleum resin having a petroleum-derived aromatic monomer unit at 50% by weight or more, 55% by weight or more, 60% by weight or more, 65% by weight or more, 70% by weight or more, 75% by weight or more, 80% by weight or more, 85% by weight or more, 90% by weight or more, 95% by weight or more, or 100% by weight based on the total weight of the petroleum resin.

The aliphatic olefin polymer may refer to a polymer having an aliphatic olefin monomer unit at 50% by weight or more, 55% by weight or more, 60% by weight or more, 65% by weight or more, 70% by weight or more, 75% by weight or more, 80% by weight or more, 85% by weight or more, 90% by weight or more, 95% by weight or more, or 100% by weight based on the total weight of the polymer. The aliphatic olefin monomer may be, for example, an alkene-based monomer, a conjugated diene-based monomer, or a non-conjugated diene-based monomer.

The alkene-based monomer may be one selected from the group consisting of ethylene, propylene, α-butylene, cis-β-butylene, trans-β-butylene, isobutylene, and a combination of two or more thereof, but the present invention is not limited thereto. The aliphatic olefin polymer may be formed by polymerizing conjugated diene-based monomers or copolymerizing conjugated diene-based monomers with aromatic vinyl monomers, and as the conjugated diene-based monomer and the aromatic vinyl monomer, the same monomers as described above may be used. The aliphatic olefin polymer may be, for example, polyethylene, polypropylene, polybutylene, polybutene, polyisobutene, butadiene rubber, isoprene rubber, or styrene-butadiene rubber, but the present invention is not limited thereto.

The amount of the plasticizer may be 10 parts by weight or more, 15 parts by weight or more, or 20 parts by weight or more and 50 parts by weight or less, 45 parts by weight or less, 40 parts by weight or less, or 35 parts by weight or less based on 100 parts by weight of the elastomer. When the amount of the plasticizer is less than 10 parts by weight, the processability of the composition may be degraded, and when the amount of the plasticizer is more than 50 parts by weight, the mechanical properties of a final product may be degraded, making it difficult to use the final product for a tire tread.

The amount of the aliphatic olefin polymer may be 5% by weight or more, 10% by weight or more, 15% by weight or more, or 20% by weight or more and 60% by weight or less, 55% by weight or less, 50% by weight or less, 45% by weight or less, 40% by weight or less, 35% by weight or less, or 30% by weight or less based on the total weight of the plasticizer. When the amount of the aliphatic olefin polymer is less than 5% by weight, fuel efficiency characteristics may be degraded, and when the amount of the aliphatic olefin polymer is more than 60% by weight, the effect of improving the braking performance of a final product may be significantly reduced.

One end or both ends of the aliphatic olefin polymer may be functionalized with a silane-based compound. When one end or both ends of the aliphatic olefin polymer are functionalized with the silane-based compound, bonding strength with fillers such as silica can be improved, and the mechanical properties and fuel efficiency characteristics of a final product can be improved.

The end-functionalization may be performed, for example, by adding a functionalizing agent to a living polymer during the polymerization of the polymer to functionalize an end of the polymer, or by reacting an alkoxysilane-containing isocyanate with a functional group present at an end of the polymer, in which case, one end or both ends of the polymer may be functionalized by adjusting the reaction ratio of the functional group and the isocyanate. For example, when the ratio of the functional group and the isocyanate is 2:1, a polymer with one functionalized end can be obtained, and when the ratio is 1:1, a polymer with both functionalized ends can be obtained. The functional group may be, for example, an alcohol (—OH), an ether (—COC—), or the like capable of reacting with an isocyanate, but the present invention is not limited thereto. The alkoxysilane compound may have one to three alkoxy functional groups, and the alkoxysilane compound may have one to ten or one to five carbon atoms. Therefore, the functionalized polymer may have one or more, for example, one to three or two to six alkoxysilane functional groups. The following chemical formula represents an example of such an end-functionalized polymer, but the present invention is not limited thereto.

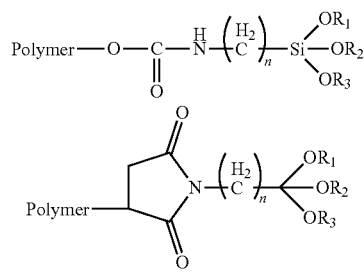

In the above chemical formula, n may be in the range of 1 to 10.

The aromatic petroleum resin of the plasticizer may be a liquid C9 petroleum resin, and the aliphatic olefin polymer of the plasticizer may be a liquid conjugated diene-based polymer, a liquid saturated hydrocarbon polymer, or a combination thereof. When all components of the plasticizer are liquid at room temperature, the fuel efficiency characteristics of a tire tread can be improved.

In the liquid conjugated diene-based polymer, at least some of the double bonds may be hydrogenated. When the liquid conjugated diene-based polymer is hydrogenated, since the number of double bonds in the polymer is reduced, the problem that plasticizer performance is degraded due to excessive crosslinking can be prevented. The percentage of double bonds of the liquid conjugated diene-based polymer that are hydrogenated may be 10% or more, 20% or more, 30% or more, or 40% or more and 100% or less, 90% or less, 80% or less, 70% or less, or 60% or less. When the percentage of hydrogenation satisfies the above range, ozone resistance and heat resistance can be improved, and at the same time, the problem that grip performance and abrasion resistance are degraded due to excessive crosslinking can be prevented.

The C9 petroleum resin is a type of petroleum resin produced based on a C9 monomer derived from an aromatic olefin, and the C9 monomer derived from an aromatic olefin may be a mixed C9 oil fraction generated in a naphtha cracking process or a pure C9 oil fraction obtained by purifying the mixed C9 oil fraction.

The liquid C9 petroleum resin may satisfy one or more of conditions (i) to (iii): (i) a glass transition temperature ($T_g$) of −50° C. or more, −45° C. or more, −40° C. or more, −35° C. or more, −30° C. or more, −25° C. or more, or −20° C. or more and −5° C. or less or −10° C. or less; (ii) a viscosity of 500 cP or more, 1,500 cP or more, 2,500 cP or more, 3,500 cP or more, 4,500 cP or more, 5,500 cP or more, 6,500 cP or more, 7,500 cP or more, or 8,500 cP or more and 20,000 cP or less, 19,000 cP or less, 18,000 cP or less, 17,000 cP or less, 16,000 cP or less, 15,000 cP or less, 14,000 cP or less, 13,000 cP or less, or 12,000 cP or less at 60° C.; and (iii) a softening point of 40° C. or less, 35° C. or less, or 30° C. or less and 0° C. or more, 5° C. or more, 10° C. or more, 15° C. or more, or 20° C. or more. When the liquid C9 petroleum resin satisfies at least one of the conditions (i) to (iii), the braking performance of a final product, which is expressed as tan δ at 0° C., and mechanical properties such as tensile strength and abrasion resistance can be improved.

The liquid conjugated diene-based polymer may satisfy one or more of conditions (i') to (iii'): (i') a glass transition temperature ($T_g$) of −95° C. or more, −85° C. or more, −75° C. or more, 65° C. or more, or −55° C. or more and −5° C. or less, −15° C. or less, −25° C. or less, or −35° C. or less; (ii') a molecular weight of 500 g/mol or more, 750 g/mol or more, 1,000 g/mol or more, or 1,250 g/mol or more and 50,000 g/mol or less, 45,000 g/mol or less, 40,000 g/mol or less, 35,000 g/mol or less, 30,000 g/mol or less, 25,000 g/mol or less, 20,000 g/mol or less, 15,000 g/mol or less, 10,000 g/mol or less, or 5,000 g/mol or less; and (iii') a vinyl content of 0% by weight or more, 15% by weight or more, 20% by weight or more, or 25% by weight or more and 90% by weight or less, 85% by weight or less, 80% by weight or less, or 75% by weight or less. When the liquid conjugated diene-based polymer satisfies at least one of the conditions (i') to (iii'), since the rolling resistance of a final product, which is expressed as tan δ at 60° C., is reduced, fuel efficiency characteristics can be improved.

The liquid saturated hydrocarbon polymer may satisfy one or more of conditions (i") and (ii"): (i") a glass transition temperature ($T_g$) of −85° C. or more or −80° C. or more and −65° C. or less or −70° C. or less; and (ii") a viscosity of 30 cP or more, 100 cP or more, 250 cP or more, or 500 cP or more and 3,000 cP or less, 2,500 cP or less, or 2,000 cP or less at 100° C. When the liquid saturated hydrocarbon polymer satisfies at least one of the conditions (i") and (ii"), the fuel efficiency characteristics and abrasion resistance of a final product can be improved. The liquid saturated hydrocarbon polymer satisfying the above condition(s) may be polybutene or polyisobutene, but the present invention is not limited thereto.

The composition may be prepared by a wet mixing method in which after the elastomer is solution-polymerized and before a solvent is removed from the elastomer, the plasticizer is mixed with and dispersed in the elastomer. When the plasticizer is mixed in the same manner as a process oil used as a plasticizer in a conventional compounding process, it may be difficult for the user to knead rubber due to the high viscosity of the plasticizer, but when the composition is prepared by the wet mixing method, the dispersibility of the plasticizer having high viscosity can be greatly improved, and the mechanical properties of a final product can be improved.

A rubber compounding product may be obtained by adding additives such as a filler (e.g., silica or carbon black), an anti-aging agent, a vulcanizing agent, and a vulcanization accelerator to the composition and performing mixing. Although a rubber compounding product for a tire tread is generally produced through processes including: 1) kneading one or more types of rubber; 2) adding a filler such as silica or carbon black, an inorganic filler, and a plasticizer and performing kneading; and 3) adding sulfur and a vulcanization accelerator and performing kneading, when the composition according to one embodiment of the present invention is used, the kneading in step 1) can be performed more easily than in the related art, and the adding of the plasticizer in step 2) can be selectively performed.

According to a non-limiting exemplary embodiment of the present invention, since a liquid petroleum resin and a liquid conjugated diene-based polymer functionalized with a silica-friendly functional group are introduced into a rubber composition for a tire tread, braking performance can be improved, and at the same time, the problem of degradation of fuel efficiency characteristics can be controlled.

Manufacturing Method of Rubber Composition for Tire Tread

A manufacturing method of a rubber composition for a tire tread according to another aspect of the present invention may include: (a) adding 10 to 50 parts by weight of a plasticizer containing an aromatic petroleum resin and an aliphatic olefin polymer to 100 parts by weight of a solution containing a solution-polymerized elastomer; and (b) removing a solvent contained in a product of the step (a).

Here, types and properties of the elastomer, plasticizer, aromatic petroleum resin, aliphatic olefin polymer, liquid C9 petroleum resin, liquid conjugated diene-based polymer, liquid saturated hydrocarbon polymer, and the like may be the same as those of the rubber composition for a tire tread described above. For example, the solution-polymerized elastomer may have a conjugated diene-based monomer unit or a conjugated diene-based monomer unit and an aromatic vinyl monomer unit, and types of the aromatic vinyl monomer and conjugated diene-based monomer may be the same as described above.

The step (a) may be carried out by a wet mixing method in which a rubber composition for a tire tread is prepared by premixing the plasticizer before drying and solidifying the solution-polymerized elastomer. As described above, the plasticizer containing an aromatic petroleum resin and an aliphatic olefin polymer has a higher viscosity than process oils generally used as plasticizers and thus may have low dispersibility with solidified rubber when mixed with the rubber. Therefore, in the step (a), the plasticizer is mixed with the elastomer which is in a state of being dispersed in a solvent after being solution-polymerized so that a rubber composition for a tire tread in which all components are uniformly mixed can be obtained. In addition, since the dispersibility of the plasticizer in rubber is superior as compared to the case where the plasticizer is added after solidified rubber is pulverized and then re-dispersed in a solvent, the processability of a manufactured composition and the fuel efficiency characteristics of a final product can be improved.

After the step (b), in step (c), one selected from the group consisting of elastomers having different properties, for example, natural rubber, styrene-butadiene rubber, butadiene rubber, isoprene rubber, nitrile rubber, neoprene rubber, ethylene-propylene-diene monomer (EPDM) rubber, and a combination of two or more thereof, may be added to a product of the step (b) depending on an application mode of a final product.

Hereinafter, exemplary embodiments of the present invention will be described in more detail. However, the following experimental results are experimental results of only representative exemplary embodiments, and the scope and content of the present invention should not be reduced or limited by the exemplary embodiments and the like. Effects of various embodiments of the present invention not explicitly described below will be specifically described in relevant sections.

Manufacturing Example

After inputting 42 g of styrene, 153.5 g of 1,3-butadiene, 1,200 g of cyclohexane, and 5 mL of tetrahydrofuran (THF)

into a 5 L reactor, the temperature inside the reactor was adjusted to 35° C. while stirring. When the temperature inside the reactor reached 35° C., 1.2 mmol of n-butyllithium, which is a polymerization initiator, was added, and an adiabatic warming reaction was carried out. When reaction temperature reached a peak, 4.5 g of 1,3-butadiene was additionally added so that a reaction end was substituted with butadiene, and then 1.4 mmol of 3-aminopropyltriethoxysilane, which is an end-functionalizing agent, was added and maintained for a predetermined period of time. Subsequently, 2 g of butylated hydroxyl toluene, which is an antioxidant, was added and the reaction was terminated, and thereby a rubber solution was obtained.

Example 1

To the rubber solution obtained in Manufacturing Example, which contained 200 g of solution-polymerized styrene-butadiene rubber and 1,200 g of cyclohexane, 60 g of a liquid C9 petroleum resin having a viscosity of 10,000 cP at 60° C. and a glass transition temperature of −10° C. and 15 g of liquid hydrogenated polybutadiene having a glass transition temperature of −45° C. and a molecular weight of 1,500 g/mol and having a trimethoxysilane-functionalized end were added. After stirring for a sufficient time to completely disperse the liquid petroleum resin and the liquid hydrogenated polybutadiene in the rubber solution, the solvent was removed by applying steam, the resultant was roll-dried, and thereby a solidified rubber composition was obtained.

The solidified rubber composition and high cis polybutadiene rubber were mixed in a weight ratio of 11:2, and based on 100 parts by weight of the rubber components, a silica filler at 80 parts by weight, a silane coupling agent at 12.8 parts by weight, zinc oxide at 3 parts by weight, stearic acid at 2 parts by weight, an antioxidant at 1 part by weight, sulfur at 1.5 parts by weight, and a vulcanization accelerator at 1.8 parts by weight were added and mixed, and thereby a rubber compounding product was obtained.

Example 2

A rubber composition and a rubber compounding product were obtained in the same manner as in Example 1 except that the liquid petroleum resin and liquid hydrogenated polybutadiene used in Example 1 were added in the amounts of 52.5 g and 22.5 g, respectively.

Example 3

A rubber composition and a rubber compounding product were obtained in the same manner as in Example 1 except that the liquid petroleum resin and liquid hydrogenated polybutadiene used in Example 1 were added in the amounts of 75 g and 20 g, respectively, and the solidified rubber composition and the high cis polybutadiene rubber were mixed in a weight ratio of 12:2 in a compounding process.

Example 4

A rubber composition and a rubber compounding product were obtained in the same manner as in Example 1 except that 15 g of liquid polybutene having a trimethoxysilane-functionalized end was added instead of the liquid hydrogenated polybutadiene used in Example 1.

Example 5

A rubber composition and a rubber compounding product were obtained in the same manner as in Example 1 except that a rubber solution prepared by pulverizing 200 g of styrene-butadiene rubber, which had been solution-polymerized and then solidified, and re-dispersing the styrene-butadiene rubber in 1,200 g of cyclohexane was used instead of the rubber solution of Manufacturing Example, which was used in Example 1.

Comparative Example 1

The solvent was removed from the rubber solution obtained in Manufacturing Example, which contained 200 g of solution-polymerized styrene-butadiene rubber and 1,200 g of cyclohexane, by applying steam, the resultant was roll-dried, and thereby a solidified rubber composition was obtained. The solidified rubber composition and high cis polybutadiene rubber were mixed in a weight ratio of 8:2, and based on 100 parts by weight of the rubber components, a silica filler at 80 parts by weight, a silane coupling agent at 12.8 parts by weight, a TDAE oil at 30 parts by weight, zinc oxide at 3 parts by weight, stearic acid at 2 parts by weight, an antioxidant at 1 part by weight, sulfur at 1.5 parts by weight, and a vulcanization accelerator at 1.8 parts by weight were added and mixed, and thereby a rubber compounding product was obtained.

Comparative Example 2

A rubber composition and a rubber compounding product were obtained in the same manner as in Comparative Example 1 except that compared to the production of a rubber compounding product carried out in Comparative Example 1, a terpene-phenol resin having a softening point of 105° C. and a glass transition temperature of 55° C. was additionally added at 10 parts by weight based on 100 parts by weight of rubber components.

Comparative Example 3

A rubber composition and a rubber compounding product were obtained in the same manner as in Example 1 except that the liquid hydrogenated polybutadiene used in Example 1 was excluded and 75 g of the liquid C9 petroleum resin having a viscosity of 10,000 cP at 60° C. and a glass transition temperature of −10° C. was added to the rubber solution.

In the above Examples and Comparative Examples, viscosity was measured using a rotary viscometer (Brookfield), softening point was measured at 5° C./min in accordance with ASTM E 28, glass transition temperature ($T_g$) was measured by differential scanning calorimetry (DSC), a vinyl content was measured by the Morero method (Chim. Ind., Vol 41, p 758, 1959), and molecular weight (weight-average molecular weight) was measured by gel permeation chromatography at 40° C. using a THF solvent in accordance with the standard polystyrene measurement method.

Compounding ratios of the rubber compounding products produced in Examples 1 to 5 and Comparative Examples 1 to 3 are shown in the following Table 1.

TABLE 1

| Classification | Example 1 | Example 2 | Example 3 | Example 4 | Example 5 | Comparative Example 1 | Comparative Example 2 | Comparative Example 3 |
|---|---|---|---|---|---|---|---|---|
| Rubber composition | 110 | 110 | 120 | 110 | 110 | 80 | 80 | 110 |
| High cis polybutadiene rubber | 20 | 20 | 20 | 20 | 20 | 20 | 20 | 20 |
| Silane coupling agent | 12.8 | 12.8 | 12.8 | 12.8 | 12.8 | 12.8 | 12.8 | 12.8 |
| Silica | 80 | 80 | 80 | 80 | 80 | 80 | 80 | 80 |
| TDAE oil | — | — | — | — | — | 30 | 30 | — |
| Terpene-phenol resin | — | — | — | — | — | — | 10 | — |
| Zinc oxide | 3 | 3 | 3 | 3 | 3 | 3 | 3 | 3 |
| Stearic acid | 2 | 2 | 2 | 2 | 2 | 2 | 2 | 2 |
| Antioxidant | 1 | 1 | 1 | 1 | 1 | 1 | 1 | 1 |
| Sulfur | 1.5 | 1.5 | 1.5 | 1.5 | 1.5 | 1.5 | 1.5 | 1.5 |
| Vulcanization accelerator | 1.8 | 1.8 | 1.8 | 1.8 | 1.8 | 1.8 | 1.8 | 1.8 |

(units: parts by weight)

High cis polybutadiene rubber: NdBR 40 (Kumho Petrochemical)
Silane coupling agent: Bis(triethoxysilylpropyl)tetrasulfide

Experimental Example

The rubber compounding products produced in Examples and Comparative Examples were vulcanized by pressing with a high-temperature press and then subjected to a molding operation to prepare rubber specimens, and properties were measured and results thereof are shown in Table 2. The properties were measured by the following methods.

Compound Mooney viscosity (@ 100° C.): An unvulcanized compounding product was fixed to the front and rear of a rotor and then mounted on a rotary viscometer (MV 2000 Mooney viscometer commercially available from Alpha Technologies). After initially preheating to 100° C. for one minute, the rotor was operated, and compound Mooney viscosity expressed as $ML_{1+4}$@ 100° C. was measured by measuring a change in the viscosity of the compounding product for four minutes.

Dynamic property of vulcanized rubber (tan δ): The dynamic property was analyzed under the conditions of a frequency of 10 Hz and a strain of 0.2 using a DTMA V instrument commercially available from Rheometric Scientific, Inc.

Hardness: The hardness was measured using a Shore-A hardness tester.

Modulus, tensile strength, and elongation: The modulus at 300% elongation, tensile strength, and elongation were measured in accordance with the ASTM 3189 Method B using a universal testing machine (UTM).

Abrasion amount: A degree of abrasion was measured using a Lambourn abrasion tester, by bringing a grinding stone into direct contact with a specimen.

TABLE 2

| Classification | Example 1 | Example 2 | Example 3 | Example 4 | Example 5 | Comparative Example 1 | Comparative Example 2 | Comparative Example 3 |
|---|---|---|---|---|---|---|---|---|
| Compound Mooney viscosity ($ML_{1+4}$, 100° C.) | 111 | 107 | 83 | 110 | 119 | 92 | 75 | 118 |
| tanδ@0° C. | 0.2123 | 0.2130 | 0.2155 | 0.2230 | 0.2097 | 0.1636 | 0.1946 | 0.1974 |
| tanδ@60° C. | 0.0875 | 0.0863 | 0.0897 | 0.0839 | 0.0911 | 0.0837 | 0.0951 | 0.1025 |
| Hardness | 72 | 71 | 69 | 71 | 71 | 72 | 65 | 74 |
| 300% Modulus (kgf/cm$^2$) | 165 | 160 | 99 | 167 | 132 | 116.4 | 79 | 154.8 |
| Tensile strength (kgf/cm$^2$) | 212 | 196 | 209 | 217 | 175 | 183.3 | 207 | 205.6 |
| Elongation (%) | 372 | 382 | 533 | 388 | 350 | 363.6 | 488 | 378.4 |
| Abrasion amount (g) | 0.0380 | 0.0398 | 0.0384 | 0.0376 | 0.0399 | 0.0457 | 0.0413 | 0.0396 |

Referring to Table 2, compared to the rubber specimen of Comparative Example 1 using a conventional TDAE oil as a plasticizer for rubber compounding, tan δ@0° C. was significantly increased for the rubber specimens of Examples 1 to 5, so it can be seen that wet grip properties required for rubber for tires were excellent.

In addition, Examples 1 to 5 showed superior wet grip properties, fuel efficiency characteristics, and abrasion characteristics as compared to Comparative Example 2 in which a terpene-phenol resin was added to improve wet grip properties when using a TDAE oil as a plasticizer.

In the case of Examples 1 to 5, in which end-functionalized liquid hydrogenated polybutadiene or liquid polybutene were used in combination with a liquid petroleum resin, tan δ@0° C. was increased and thus wet grip properties were improved, and at the same time, tan δ@60° C. was decreased and thus excellent fuel efficiency characteristics were realized as compared to the case of Comparative Example 3, in which only a liquid petroleum resin was used.

Compared to Example 5 manufactured according to a conventional wet masterbatch method, in the case of Example 1 in which a liquid plasticizer was added without solvent removal after solution polymerization, the modulus, tensile strength, and the like were high and tan δ@60° C. was low, and therefore, mechanical properties and fuel efficiency characteristics were excellent.

That is, according to the above results, when an aromatic petroleum resin and an aliphatic olefin polymer are applied as plasticizers for a rubber composition, the braking performance of tires can be improved, and at the same time, the degradation of fuel efficiency characteristics can be prevented, and when the plasticizers are dispersed in rubber in advance, the dispersibility of a liquid plasticizer in rubber can be improved, and at the same time, manufacturing convenience can be improved.

According to one aspect of the present invention, the braking performance of a final product can be improved, and at the same time, the degradation of fuel efficiency characteristics can be minimized.

According to another aspect of the present invention, the dispersibility of all components can be improved, and user convenience in manufacturing a rubber compounding product can be improved.

However, it should be understood that effects of the present invention are not limited to the above-described effects and include all effects that can be deduced from the configuration of the invention described in the detailed description of the invention or the scope of the appended claims.

The above description of the present invention is only for illustrative purposes, and those of ordinary skill in the art to which the present invention pertains will understand that the present invention can be implemented in other specific forms without changing the technical spirit or essential features of the present invention. Accordingly, it should be understood that the exemplary embodiments described above are illustrative and non-limiting in all respects. For example, each component described in a combined form may be implemented in a distributed manner, and similarly, a component described as being distributed may also be implemented in a combined form.

The scope of the present invention is indicated by the appended claims, and all changes or modified forms derived from the meaning and scope of the claims and equivalent concepts thereof should be construed as being included in the scope of the present invention.

What is claimed is:

1. A rubber composition for a tire tread, comprising:
a combination of polybutadiene rubber, and a solution-polymerized elastomer having styrene monomer unit and butadiene monomer unit, at 100 parts by weight; and
a plasticizer containing an aromatic petroleum resin and an aliphatic olefin polymer, at 20 to 40 parts by weight,
wherein an amount of the aliphatic olefin polymer is 20 to 30% by weight based on a total weight of the plasticizer,
wherein the aromatic petroleum resin of the plasticizer is a liquid C9 petroleum resin, and the aliphatic olefin polymer of the plasticizer is a liquid conjugated diene-based polymer, a liquid saturated hydrocarbon polymer, or a combination thereof, and
wherein the liquid C9 petroleum resin has a softening point of 40° C. or less.

2. The rubber composition of claim 1, wherein one end or both ends of the aliphatic olefin polymer are functionalized with a silane-based compound.

3. The rubber composition of claim 1, wherein in the liquid conjugated diene-based polymer, at least some of double bonds are hydrogenated.

4. The rubber composition of claim 1, wherein the liquid C9 petroleum resin satisfies one or more of conditions (i) to (ii):
(i) a glass transition temperature ($T_g$) of −50 to −5° C.; and
(ii) a viscosity of 500 to 20,000 cP at 60° C.

5. The rubber composition of claim 1, the liquid conjugated diene-based polymer satisfies one or more of conditions (i') to (iii'):
(i') a glass transition temperature ($T_g$) of −95 to −5° C.;
(ii') a molecular weight of 500 to 50,000 g/mol; and
(iii') a vinyl content of 0 to 90% by weight.

6. The rubber composition of claim 1, wherein the liquid saturated hydrocarbon polymer satisfies one or more of conditions (i") and (ii"):
(i") a glass transition temperature ($T_g$) of −85 to −65° C.; and
(ii") a viscosity of 30 to 3,000 cP at 100° C.

7. A method of manufacturing a rubber composition for a tire tread, comprising:
(a) adding 20 to 40 parts by weight of a plasticizer containing an aromatic petroleum resin and an aliphatic olefin polymer to 100 parts by weight of a solution containing polybutadiene rubber, and a solution-polymerized elastomer having styrene monomer unit and butadiene monomer unit; and
(b) removing a solvent contained in a product of (a),
wherein an amount of the aliphatic olefin polymer is 20 to 30% by weight based on a total weight of the plasticizer,
wherein the aromatic petroleum resin of the plasticizer is a liquid C9 petroleum resin, and the aliphatic olefin polymer of the plasticizer is a liquid conjugated diene-based polymer, a liquid saturated hydrocarbon polymer, or a combination thereof, and
wherein the liquid C9 petroleum resin has a softening point of 40° C. or less.

8. The method of claim 7, wherein one end or both ends of the aliphatic olefin polymer are functionalized with a silane-based compound.

9. The method of claim 7, wherein in the liquid conjugated diene-based polymer, at least some of double bonds are hydrogenated.

10. The method of claim 7, wherein the liquid C9 petroleum resin satisfies one or more of conditions (i) to (ii):
(i) a glass transition temperature ($T_g$) of −50 to −5° C.; and
(ii) a viscosity of 500 to 20,000 cP at 60° C.

11. The method of claim 7, wherein the liquid conjugated diene-based polymer satisfies one or more of conditions (i') to (iii'):
(i') a glass transition temperature ($T_g$) of −95 to −5° C.;
(ii') a molecular weight of 500 to 50,000 g/mol; and
(iii') a vinyl content of 0 to 90% by weight.

12. The method of claim 7, wherein the liquid saturated hydrocarbon polymer satisfies one or more of conditions (i") and (ii"):
- (i") a glass transition temperature ($T_g$) of −85 to −65° C.; and
- (ii") a viscosity of 30 to 3,000 cP at 100° C.

* * * * *